United States Patent
Baltus et al.

(10) Patent No.: US 9,267,726 B2
(45) Date of Patent: Feb. 23, 2016

(54) DEVICE AND METHOD FOR COOL DRYING

(75) Inventors: Frits Cornelis A. Baltus, Schelle (BE); Johan Hendrik R. De Herdt, Antwerp (BE); Frank Jacques E. Roelants, Rumst (BE)

(73) Assignee: ATLAS COPCO AIRPOWER, N.V., Wilrijk (BE)

( * ) Notice: Subject to any disclaimer, the term of this patent is extended or adjusted under 35 U.S.C. 154(b) by 732 days.

(21) Appl. No.: 13/511,484

(22) PCT Filed: Nov. 8, 2010

(86) PCT No.: PCT/BE2010/000078
§ 371 (c)(1),
(2), (4) Date: May 23, 2012

(87) PCT Pub. No.: WO2011/063478
PCT Pub. Date: Jun. 3, 2011

(65) Prior Publication Data
US 2013/0125567 A1 May 23, 2013

(30) Foreign Application Priority Data
Nov. 24, 2009 (BE) .................................. 2009/0726

(51) Int. Cl.
*F25B 31/00* (2006.01)
*F25B 41/00* (2006.01)
(Continued)

(52) U.S. Cl.
CPC .............. *F25D 17/04* (2013.01); *B01D 53/265* (2013.01); *F04D 29/701* (2013.01); *F25B 25/005* (2013.01); *F25B 2400/04* (2013.01); *F25B 2400/0403* (2013.01); *F25B 2400/0409* (2013.01); *F25B 2400/0411* (2013.01);
(Continued)

(58) Field of Classification Search
CPC . B01D 53/265; F04D 29/701; F25B 2400/04; F25B 25/005; F25B 2600/2501
USPC ....................................................... 62/93, 197
See application file for complete search history.

(56) References Cited

U.S. PATENT DOCUMENTS

| 4,446,704 A | * | 5/1984 | Yamazaki et al. | .............. 62/180 |
| 4,462,219 A | * | 7/1984 | Iwata | .......................... 62/196.1 |

(Continued)

FOREIGN PATENT DOCUMENTS

| DE | 3522974 A1 | 1/1987 |
| EP | 1103296 A1 | 5/2001 |

(Continued)

OTHER PUBLICATIONS

International Search Report for PCT/BE2010/000078, May 24, 2011.

*Primary Examiner* — M. Alexandra Elve
*Assistant Examiner* — Henry Crenshaw
(74) *Attorney, Agent, or Firm* — Bacon & Thomas, PLLC

(57) ABSTRACT

Device for cool drying gas includes a heat exchanger whose primary part is the evaporator of a cooling circuit. The gas to be dried is guided through the secondary part of the heat exchanger to cool the gas and to condense water vapor out of the gas. At least one bypass pipe is provided with a control valve which is controlled by a control unit as a function of signals received from a measuring element for measuring the lowest gas temperature (LAT) or the dew point of the gas in the secondary part of the heat exchanger. The measuring element is positioned directly inside the secondary part of the heat exchanger. Also provided is a measuring element for measuring the temperature of the coolant in the evaporator.

18 Claims, 2 Drawing Sheets

(51) Int. Cl.
    *F25D 17/04*     (2006.01)
    *B01D 53/26*     (2006.01)
    *F04D 29/70*     (2006.01)
    *F25B 25/00*     (2006.01)

(52) U.S. Cl.
    CPC .................. *F25B2600/2501* (2013.01); *F25B 2700/21173* (2013.01); *F25B 2700/21175* (2013.01)

(56) References Cited

U.S. PATENT DOCUMENTS

| | | | |
|---|---|---|---|
| 6,092,380 A * | 7/2000 | Kachur et al. | 62/228.3 |
| 6,393,850 B1 * | 5/2002 | Vanderstraeten | 62/196.3 |
| 6,516,622 B1 * | 2/2003 | Wilson et al. | 62/228.3 |
| 2002/0174665 A1 * | 11/2002 | Pritchard et al. | 62/93 |
| 2004/0237555 A1 * | 12/2004 | Andrews | 62/230 |
| 2009/0025407 A1 * | 1/2009 | Dalla Valle et al. | 62/129 |
| 2009/0228192 A1 * | 9/2009 | Noyama et al. | 701/111 |
| 2009/0229279 A1 * | 9/2009 | Dalla Valle et al. | 62/93 |
| 2009/0320505 A1 * | 12/2009 | Van Dijck et al. | 62/89 |
| 2010/0139300 A1 * | 6/2010 | Jeong et al. | 62/186 |
| 2013/0125567 A1 * | 5/2013 | Baltus et al. | 62/93 |

FOREIGN PATENT DOCUMENTS

| | | |
|---|---|---|
| WO | 2007022604 A1 | 3/2007 |
| WO | 2008055322 A1 | 5/2008 |

\* cited by examiner

DEVICE AND METHOD FOR COOL DRYING

BACKGROUND OF THE INVENTION

A. Field of the Invention

The present invention relates to a device for cool drying gas.

B. Related Art

More specifically, the invention relates to a device that consists of a heat exchanger whose primary part is the evaporator of a cooling circuit and a gas to be dried flows through the secondary part thereof, which cooling circuit is filled with a coolant and further contains a compressor and a condenser and first expansion means between the condenser outlet and the inlet to the above-mentioned evaporator, whereby there is at least one bypass pipe that connects the discharge side of the compressor to the intake side of the compressor, whereby second expansion means are provided in this bypass pipe and a control valve which is controlled by a control unit as a function of signals received from one or more measuring elements.

As is known, cool drying is based on the principle that by reducing the gas temperature, the moisture in the gas condenses, after which the condensed water is separated in a liquid separator and after which the gas is again heated such that it is no longer saturated.

Compressed air which is for example delivered by a compressor is generally saturated with water vapour, or in other words has a relative humidity of 100%. This means that condensation occurs in the event of a temperature drop to below the so-called dew point. As a result of the condensed water, corrosion will occur in the piping and tools and the equipment can exhibit premature wear.

Hence compressed air is dried, which can be done in the above-mentioned way by cool drying. Air other than compressed air or other gases can also be dried in this way.

When drying compressed air, the air in the heat exchanger must not be cooled down too much as the condensate would then freeze. Typically the dried compressed air has a temperature of two to three degrees above zero or 20 degrees Celsius below ambient temperature. The temperature of the coolant in the evaporator is kept between 15° C. and −5° C. for this purpose.

Traditionally the temperature of the coolant is kept under control by equipping the device with at least one bypass pipe over the compressor. A control valve in an above-mentioned bypass pipe enables a certain (extra) quantity of coolant to be branched off from the cooling circuit to then be led through the above-mentioned bypass pipe over the compressor.

The control valve is hereby controlled by a control unit, also called a controller, which is connected in a known way to one or more measuring elements.

A device is already known in which one or more measuring elements are provided on the outside of the heat exchanger to measure the lowest gas temperature, also called the LAT. The LAT is the lowest occurring temperature of the gas to be dried that it is guided through the secondary part of the above-mentioned heat exchanger. Consequently, the LAT has to be measured by measuring elements which are placed where the temperature is expected to be equal to that of the gas when the cool drying device is in operation.

When the above-mentioned measuring elements register a lowest gas temperature (LAT) whereby freezing of the condensate can occur, the control unit sends a signal to the control valve to open it. In this way a certain quantity of coolant or an extra quantity of coolant is led over the compressor via an above-mentioned bypass pipe such that the cooling capacity of the cooling circuit decreases.

If the lowest gas temperature (LAT) is more than two to three degrees above zero, the control valve is closed such that the entire capacity of the cooling circuit is used to sufficiently cool the gas to be dried.

Tests have shown that it is not easy to position the measuring elements on the heat exchanger to measure the lowest gas temperature (LAT). Moreover, with some heat exchangers it has turned out to be impossible to measure the lowest gas temperature (LAT) in the above-mentioned way. It is clear that in such cases the control valve cannot be controlled on the basis of a temperature that corresponds to the lowest gas temperature (LAT).

Another disadvantage is that there is a certain time delay between the measured temperature and the actual presence of the lowest gas temperature (LAT) in the secondary part of heat exchanger at a certain point in time. This implies that the control is also executed with a certain time delay.

A further disadvantage is that, at both a high and low load of the device, the measured lowest gas temperature (LAT) deviates from the dew point of the gas, such that freezing of the condensate can nevertheless occur.

WO 2007/022604 describes a device that is equipped with a control unit to which a first measuring element is connected to measure the coolant temperature and a second measuring element to measure the lowest gas temperature (LAT) or dew point.

In one operating mode of this device, the cooling circuit is switched on and off on the basis of the measurement of the lowest gas temperature. In the event of zero load or of a small partial load, the cooling circuit is switched off by means of a third measuring element in the form of a flow sensor.

The measured value of the coolant temperature is used to control the control valve in the bypass pipe of the cooling circuit.

A disadvantage of such a device according to WO 2007/022604 consists of the use of a flow sensor such that the cost increases and the device is rather more prone to failure, and in particular depends on the good operation of the above-mentioned flow sensor to be able to adapt itself to full load or zero load conditions.

A further disadvantage of such a device consists in that the measuring element to measure the lowest gas temperature (LAT) is also in this case placed outside of the heat exchanger.

EP 1.103.296 describes a device that is equipped with two measuring elements to measure the evaporator temperature and evaporator pressure, which measuring elements are connected to a control unit to control the rotational speed of the compressor in the cooling circuit and to control the control valve in the bypass pipe. No account is taken of the lowest gas temperature (LAT).

According to another embodiment of the device according to EP 1.103.296 the above-mentioned measuring elements to measure the evaporator temperature and the evaporator pressure can be replaced by a measuring element for determining the lowest gas temperature (LAT), but in such a case no account is taken of the temperature of the coolant in the cooling circuit.

The disadvantages of such embodiments that only control the control valve on the basis of a signal from a measuring element that measures the lowest gas temperature (LAT) have already been discussed above. If the control is only based on the measured temperature of the coolant, the control will not be optimal, as the measured temperature value does then not correspond with the dew point.

SUMMARY OF THE DISCLOSURE

The purpose of the present invention is to provide a solution to one or more of the above-mentioned and/or other disadvantages, by providing a device for cool drying gas, which device comprises a heat exchanger of which the primary part is the evaporator of a cooling circuit and the gas to be dried is guided through the secondary part of the heat exchanger to cool the gas and to condense water vapour out of the gas, which cooling circuit is filled with a coolant and further comprises a compressor and a condenser and first expansion means between the outlet of the condenser and the inlet of the above-mentioned evaporator, whereby at least one bypass pipe is provided connecting the discharge side of the compressor to the intake side of the compressor, and whereby second expansion means are provided in this bypass pipe, as well as a control valve which is controlled by a control unit as a function of signals received from one or more measuring elements, whereby, according to the specific characteristic of the invention at least one measuring element is a measuring element for measuring the lowest gas temperature (LAT) or the dew point of the gas in the secondary part of the heat exchanger, whereby this measuring element is positioned directly inside the secondary part of the heat exchanger, whereby at least one additional measuring element is a measuring element for measuring the temperature of the coolant in the evaporator, whereby the above-mentioned control unit is provided with an algorithm that determines whether the device is operating at zero load or full load based on the signal from the measuring element for measuring the coolant temperature, and in the event of zero load, controls the control valve only on the basis of the signal from the measuring element for measuring the coolant temperature, and in the event of full load only controls the control valve on the basis of the signal from the measuring element measuring the lowest gas temperature (LAT) or the dew point of the gas in the secondary part of the heat exchanger.

An advantage of a device according to the invention is that the lowest gas temperature (LAT) or the dew point of the gas can be measured accurately.

Indeed, the above-mentioned measuring element for measuring the lowest gas temperature or the dew point is placed entirely or partially in the gas flow through the secondary part of the heat exchanger, such that the temperature or dew point of this gas is measured directly.

Another advantage is that the lowest gas temperature (LAT) or the dew point in the heat exchanger can be registered without a time delay such that the control valve can be controlled without a time delay.

The device is minimally loaded or unloaded when the flow of the gas to be dried through the secondary part of the heat exchanger is minimal or goes entirely to zero.

By measuring the coolant temperature it can be determined whether there is a zero load condition. Indeed, in the event of zero load the temperature of the coolant decreases.

If for example the coolant temperature is less than a certain characteristic value, typically equal to $-5°$ C., the control valve is controlled appropriately and placed in the open condition such that the capacity of the cooling circuit decreases.

An advantage hereby is that the device is protected against freezing.

Preferably the above-mentioned control unit is provided with an algorithm for determining a partial load condition of the device, based on the measured signal from the measuring element for measuring the coolant temperature, and for controlling the control valve, either according to a first subalgorithm which is a function of the signal from the measuring element for measuring the lowest gas temperature (LAT) or the dew point of the gas in the secondary part of the heat exchanger, or according to a second subalgorithm which is a function of the signal from the measuring element for measuring the coolant temperature, whereby the choice between the first and the second subalgorithm is made on the basis of the measured coolant temperature.

An advantage of this is that the device automatically adjusts itself to a varying load.

The invention also relates to a method for cool drying gas, whereby this gas is cooled by guiding it through the secondary part of a heat exchanger to condense water vapour out of the gas, whereby the primary part of the heat exchanger is the evaporator of a cooling circuit, which cooling circuit comprises a coolant, and whereby this cooling circuit is further equipped with a compressor, a condenser and first expansion means between the outlet of the condenser and the inlet of the evaporator, and whereby at least one bypass pipe is provided which connects the discharge side of the compressor to the intake side of the compressor, whereby second expansion means are provided in this bypass pipe as well as a control valve that is controlled by a control unit as a function of signals received from one or more measuring elements, whereby, according to the invention, the control unit determines whether the device is operating at zero load or full load on the basis of the coolant temperature, and at full load controls the control valve on the basis of the lowest gas temperature (LAT) or the dew point measured by at least one measuring element inside the secondary part of the heat exchanger, and at zero load controls the control valve on the basis of the coolant temperature measured by at least one additional measuring element located in the evaporator.

The advantages of the above-mentioned method are similar to the advantages linked to a device according to the invention.

Preferably the method according to the invention comprises the steps of comparing the measured coolant temperature to a maximum threshold value, and when the measured coolant temperature is situated above this maximum threshold value, the device is considered as being at full load. The above-mentioned maximum threshold value is, according to a preferable characteristic of the invention, a constant value, for example equal to or almost equal to $2°$ C.

An advantage of applying such an algorithm to determine the load condition is that it is very simple and that it does not require the presence of a flow sensor to prevent freezing, such that costs can be saved and the device is less prone to defects.

These advantages can be obtained all the better when the method according to the invention comprises the steps of comparing the measured coolant temperature to a minimum threshold value, and when the measured coolant temperature is situated below this minimum threshold value, the device is considered as being at zero load. The above-mentioned minimum threshold value is, according to a preferable characteristic of the invention, a constant value, for example equal to or almost equal to $-5°$ C.

DESCRIPTION OF THE DRAWINGS

With the intention of better showing the characteristics of the invention, a preferred embodiment is described hereafter by way of example, without any limiting nature, of a device according to the invention, with reference to the accompanying drawings, wherein.

DETAILED DESCRIPTION OF PREFERRED EMBODIMENTS OF THE INVENTION

Figure 1:
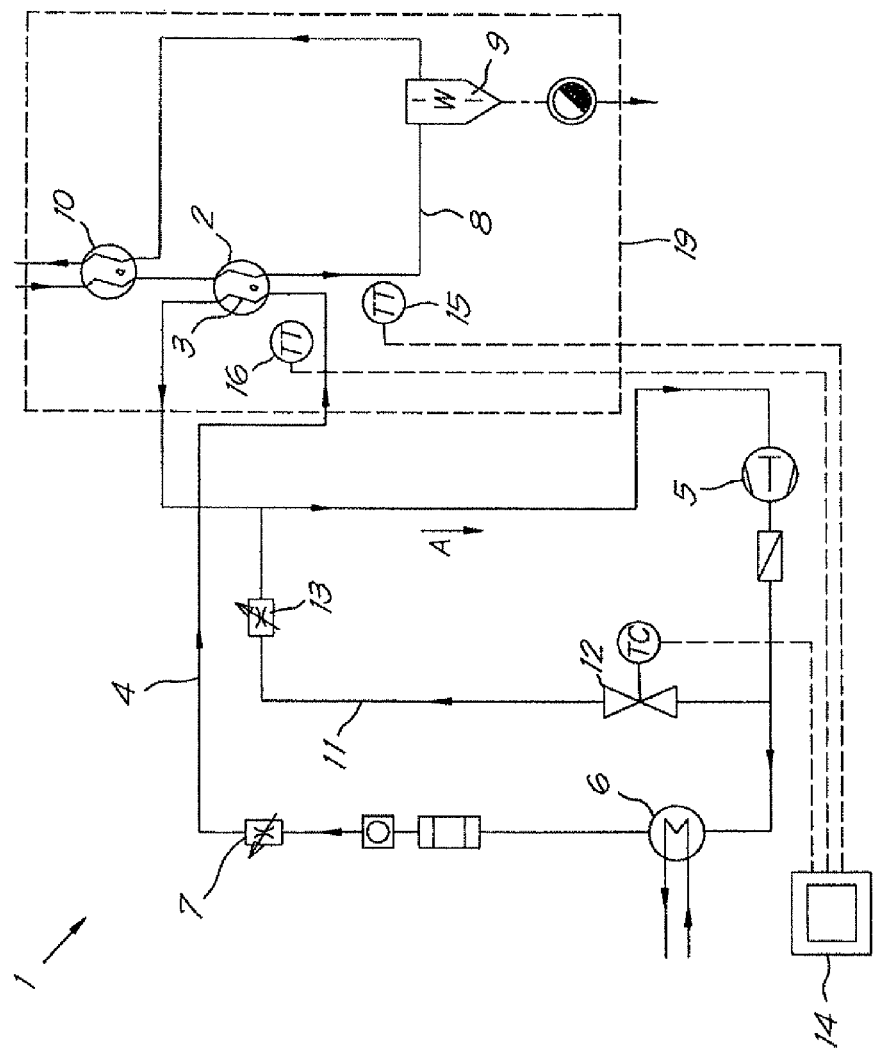
FIG. 1 shows a block diagram of a device according to the invention for cool drying gas.

The device 1 for cool drying, that is schematically shown in FIG. 1, contains a heat exchanger 2 whose primary part forms the evaporator 3 of a cooling circuit 4 in which there are successively a compressor 5, a condenser 6, and first expansion means 7, in this case in the form of an expansion valve.

The cooling circuit 4 is filled with a coolant, for example R404a, whereof the direction of flow is indicated by arrow A.

After the heat exchanger 2 there is a liquid separator 9 provided in the pipe 8.

A part of this pipe 8 may, before it reaches the heat exchanger 2, extend through a pre-cooler or recuperation heat exchanger 10 and then, after the liquid separator 9, again extend through the recuperation heat exchanger 10, in counter flow with respect to the above-mentioned part.

In this case the compressor 5 is bypassed by one bypass pipe 11 or bypass that connects the discharge side of the compressor 5 to the intake side of the compressor 5, whereby this intake side is located in the cooling circuit 4 between the outlet of the evaporator 3 and the inlet of the compressor 5.

The bypass pipe 11 is equipped with a control valve 12 for branching off coolant from the cooling circuit 4. Downstream from the above-mentioned control valve 12 are provided second expansion means 13, which in this example are constructed in the form of a hot gas bypass.

The control valve 12 is connected to a control unit 14 to which measuring elements 15-16 are also connected. In this case the measuring elements take on the form of temperature sensors.

A first measuring element 15 is hereby positioned directly inside the secondary part of the heat exchanger 2 to measure the lowest gas temperature (LAT). A second measuring element 16 is placed in the evaporator 3 to measure the coolant temperature.

The operation of the device 1 is very simple and as follows.

The gas or mixture of gases to be dried, in this case compressed air, is taken through the pipe 8 and thus through the heat exchanger 2 in the opposite direction of flow to the cooling fluid in the evaporator 3 of the cooling circuit 4.

In this heat exchanger 2, the moist air is cooled such that condensate is formed that is separated out in the liquid separator 9.

The cold air, which contains less moisture after this liquid separator 9 but still has a relative humidity of 100%, is heated in the recuperation heat exchanger 10 such that the relative humidity falls to a maximum of 50%, while the supplied air to be dried in this heat exchanger 10 is partly cooled before being added to the heat exchanger 2.

The air at the outlet of the heat exchanger 10 is thus drier than at the inlet of the heat exchanger 10.

In order to prevent the evaporator 3 from freezing, the air in the heat exchanger 2 is not cooled to below the LAT, which LAT is typically 2 to 3° C. or 20° C. below ambient temperature.

If the LAT is too high, the air is not sufficiently cooled and thus not enough moisture is condensed to dry the air sufficiently.

The above-mentioned LAT conditions are satisfied by the control unit 14 controlling the control valve 12 appropriately, such that a certain quantity of coolant is led through the bypass pipe 11 over the compressor 5. In this way the cooling capacity of the cooling circuit 4 can be varied and adjusted.

The control unit 14 controls the control valve 12 on the basis of the measured lowest gas temperature LAT and, preferably as shown in the drawing, also on the basis of the coolant temperature.

Thus the lowest gas temperature LAT is used to control the control valve 12 when the flow of the supplied air to be dried is maximum, in other words at full load of the device. At partial load the control valve 12 is controlled on the basis of the lowest gas temperature (LAT) and the coolant temperature. In order to prevent the evaporator 3 from freezing at zero load, the temperature of the coolant is used to control the control valve 12. Indeed, at zero load the coolant temperature gets too low, typically less than −5° C., after which the control valve 12 is put in an open state.

The foregoing makes it clear that the coolant temperature is used to determine when the device 1 is unloaded or at minimum load and that, in the event of zero load, the control valve 12 is controlled on the basis of the coolant temperature.

Characteristic for the invention is that the temperature sensor 15 is located inside the secondary part of the heat exchanger 2, such that, on the one hand, the lowest gas temperature (LAT) can be measured accurately and, on the other hand, the control valve, and thus the lowest gas temperature (LAT) of the air to be dried can be controlled accurately, effectively and without time delay.

To measure the lowest gas temperature (LAT) the temperature sensor 15 is preferably placed immediately after the heat exchanger with the coolant of the heat exchanger 2.

The coolant temperature is preferably measured at the inlet of the evaporator 3, as the coolant, when it enters the evaporator 3, reaches its lowest possible temperature in the cycle.

In this case the compressor 5 is a frequency controlled machine as a result of which the compressor speed is adjustable, but the embodiment as shown in FIG. 1 can also be constructed with a compressor that operates at a constant or essentially constant rotational speed.

Figure 2:
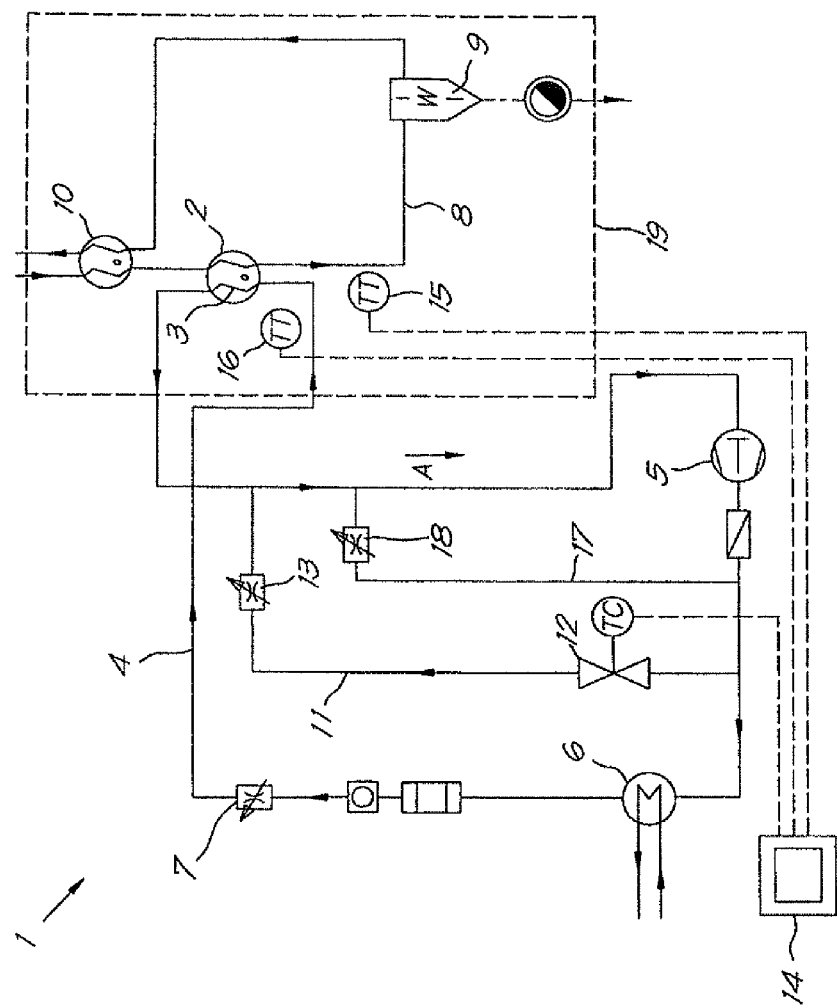
FIG. 2 shows a variant according to FIG. 1.

FIG. 2 shows a variant embodiment of a device according to the invention whereby the only difference with the device 1, as shown in FIG. 1, consists of there being provided a second bypass pipe 17 in which third expansion means 18 are provided.

The second bypass pipe 17 ensures that the pressure at the exit of the evaporator 3 does not fall below a certain minimum value so that freezing is prevented.

In this case the above-mentioned third expansion means 18 take on the form of a hot gas bypass.

The embodiment, as shown in FIG. 2, makes use of a compressor 5 that operates at a constant or mainly constant speed. This makes a complex control of the compressor 5 superfluous.

Although in the drawings, the heat exchangers 2 and 10, the pipe 8 and the liquid separator 9 are shown as separate components, they can also be incorporated into one single component 19 that is shown in the drawings as a dotted line, and in which the measuring elements 15 and 16 are placed. The pipe part 8 between the heat exchanger 2 and the liquid separator 9 is in fact not necessary in such a case, as the liquid separator 9 can be integrated into the heat exchanger 2.

The present invention is by no means limited to the embodiments described as an example and shown in the drawings, but a device and method according to the invention for cool drying can be realised in all kinds of variants, without departing from the scope of the invention.

The invention claimed is:

1. A device for cool drying gas, comprising:
a cooling circuit and a cool gas drying circuit;
a heat exchanger comprising an evaporator that is part of the cooling circuit, wherein a secondary part of the heat exchanger that is part of the cool gas drying circuit is configured to guide gas to be dried through the heat exchanger to cool the gas by the cooling circuit and to condense water vapour out of the gas;
said cooling circuit being filled with a coolant and further comprising a compressor, a condenser and a first expansion device between an outlet of the condenser and an inlet of the evaporator;
at least one bypass pipe connecting a discharge side of the compressor to an intake side of the compressor;
a second expansion device is provided in the bypass pipe;
a control valve in the bypass pipe which is controlled by a control unit as a function of signals received from at least one of at least a first measuring element and a second measuring element;
said first measuring element being arranged to measure the lowest gas temperature (LAT) or the dew point of the gas in the cool gas drying circuit;
said first measuring element being positioned to directly measure the LAT or the dew point of the gas in the cool gas drying circuit;
said second measuring element arranged to measure the temperature of the coolant in the evaporator;
said control unit being provided with an algorithm that determines whether the device is operating at zero load or full load, based on the signal from the second measuring element for measuring the coolant temperature;
wherein, in the event of zero load, the algorithm is configured to control the control valve only on the basis of a signal from the second measuring element for measuring the coolant temperature, and in the event of full load, the algorithm is configured to only control the control valve based on a signal from the first measuring element for measuring the lowest gas temperature (LAT) or the dew point of the gas in the secondary part of the heat exchanger.

2. The device according to claim 1, wherein the control unit is configured to determine whether the device is operating at a partial load condition of the device, based on the signal from the second measuring element for measuring the coolant temperature, and is configured to control the control valve, either based on the signal from the first measuring element for measuring the lowest gas temperature (LAT) or the dew point of the gas in the secondary part of the heat exchanger, or based on the signal from the second measuring element for measuring the coolant temperature.

3. The device according to claim 1, wherein the first measuring element for measuring the lowest gas temperature (LAT) or the dew point of the gas is located immediately after the heat-exchanging part with the coolant in the cool gas drying circuit.

4. The device according to claim 1, wherein the second measuring element for measuring the coolant temperature in the evaporator is located at the inlet of the evaporator.

5. The device according to claim 1, wherein the compressor operates with a constant or essentially constant rotational speed.

6. The device according to claim 5, including a second bypass pipe which connects the discharge side of the compressor to the intake side of the compressor and wherein a third expansion device is provided in the second bypass pipe.

7. The device according to claim 6, wherein the third expansion device comprises a hot gas bypass.

8. A method for cool drying gas,
wherein a device for cool drying gas comprises a cooling circuit and a cool gas drying circuit, wherein a primary part of a heat exchanger is an evaporator of the cooling circuit; the cooling circuit comprising a coolant;
the cooling circuit further comprising a compressor, a condenser and first expansion device between an outlet of the condenser and an inlet of the evaporator;
at least one bypass pipe is provided which connects a discharge side of the compressor to an intake side of the compressor,
a second expansion device is provided in the at least one bypass pipe; and
a control valve that is controlled by a control unit as a function of signals received from one or more measuring elements is provided in the at least one bypass pipe; the method comprising the steps:
guiding gas to be cooled through a secondary part of a heat exchanger to condense water vapour out of the gas;
measuring a temperature of the coolant in the evaporator using a second measuring element;
determining with the control unit whether the device is operating at zero load or full load on the basis of the measured coolant temperature; and
at full load controlling the control valve on the basis of the lowest gas temperature (LAT) or the dew point measured by at least a first measuring element that is positioned to directly measure the LAT or the dew point of the gas in the cool gas drying circuit, and at zero load controlling the control valve on the basis of the coolant temperature measured by the second measuring element located in the evaporator.

9. Method according to claim 8, including the steps of comparing the measured coolant temperature to a maximum threshold value, and when the measured coolant temperature is situated above this maximum threshold value, considering the device to be at full load.

10. Method according to claim 9, wherein the maximum threshold value is a constant value.

11. Method according to claim 10, wherein the maximum threshold value is equal or almost equal to 2° C.

12. Method according to claim 8, comprising the steps of comparing the measured coolant temperature to a minimum threshold value, and when the measured coolant temperature goes below this minimum threshold value, considering the device to be at zero load.

13. Method according to claim 12, wherein the minimum threshold value is a constant value.

14. Method according to claim 13, wherein the above-mentioned minimum threshold value is equal or almost equal to −5° C.

15. The method according to claim 8 wherein, at partial load of the device, the control valve is controlled either based on the signal from the measuring element that measures the lowest gas temperature (LAT) or the dew point of the gas in the secondary part of the heat exchanger, or based on the signal from the measuring element that measures the coolant temperature.

16. The method according to claim 8, wherein the compressor is operated at constant speed.

17. Method according to claim 16, including a second bypass pipe that connects the discharge side of the compressor to the intake side of the compressor, and a third expansion device in the second bypass pipe.

18. The device according to claim 1, wherein the control valve is controlled in a way such that a certain quantity of the coolant is led through the at least one bypass pipe to vary and adjust the cooling capacity of the cooling circuit.

\* \* \* \* \*